United States Patent [19]
Huang

[11] Patent Number: 5,797,813
[45] Date of Patent: Aug. 25, 1998

[54] HANDLE GRIP

[76] Inventor: Ben Huang, 19472 Woodlands La., Huntington Beach, Calif. 92648

[21] Appl. No.: 822,226

[22] Filed: Mar. 21, 1997

Related U.S. Application Data

[63] Continuation-in-part of Ser. No. 787,828, Jan. 23, 1997, Pat. No. 5,730,669, and Ser. No. 550,219, Oct. 30, 1995, Pat. No. 5,695,418, which is a continuation of Ser. No. 953,190, Sep. 29, 1992, abandoned, which is a continuation of Ser. No. 890,383, May 26, 1992, abandoned, which is a continuation of Ser. No. 637,931, Jan. 14, 1991, abandoned, said Ser. No. 787,828, is a continuation-in-part of Ser. No. 567,339, Dec. 28, 1995, abandoned.

[51] Int. Cl.⁶ ............................................. A63B 49/08
[52] U.S. Cl. ..................................... 473/549; 473/301
[58] Field of Search ........................ 473/549, 551, 473/300, 301, 302, 303

[56] References Cited

U.S. PATENT DOCUMENTS

| | | | |
|---|---|---|---|
| 4,567,091 | 1/1986 | Spector | 473/301 X |
| 5,435,549 | 7/1995 | Chen | 473/549 X |
| 5,491,015 | 2/1996 | Reeves et al. | 473/549 X |
| 5,524,885 | 6/1996 | Heo | 473/549 X |
| 5,624,116 | 4/1997 | Yeh | 473/549 X |
| 5,634,859 | 6/1997 | Nesbitt | 473/301 |

*Primary Examiner*—William E. Stoll
*Attorney, Agent, or Firm*—Fulwider Patton Lee & Utecht, LLP

[57] ABSTRACT

A shock absorbing grip for a golf club having a strip formed of a polyurethane layer bonded to a felt layer. The strip is spirally wrapped about the golf club handle with the side edges being formed with recessed reinforcement side edges which are overlapping to form a water retarding joint between the side edges of the strip. The felt layer may be formed with an upwardly extending central groove along its length to form a spiral depression when the strip is spirally wrapped about a handle.

21 Claims, 12 Drawing Sheets

FIG. 33

HANDLE GRIP

RELATED PATENTS AND PATENT APPLICATIONS

This Patent Application is a Continuation-in-Part Application of Ser. No. 08/550,219, filed 30 Oct., 1995, now U.S. Pat. No. 5,695,418 which is a Continuation Application of Ser. No. 07/953,190, filed 29 Sep., 1992, now abandoned, which was a Continuation of Ser. No. 07/890,383, filed 26 May, 1992, now abandoned, which was a Continuation of Ser. No. 07/637,931 filed 14 Jan., 1991, now abandoned; and this Application is also a Continuation-in-Part of Ser. No. 08/787,828, filed 23 Jan., 1997, now U.S. Pat. No. 5,730, 669, which is a Continuation-in-Part Application of Ser. No. 08/567,339, filed 28 Dec., 1995, now abandoned.

BACKGROUND OF THE INVENTION

The present invention relates to an improved grip for golf clubs and other sporting equipment employing handles subject to shock when such devices are impacted, as for example, tennis racquets, racquetball racquets, and baseball bats.

It is well known that shock generated by impact between a golf club and a golf ball or a tennis racquet and a tennis ball can adversely affect muscle tissue and arm joints, such as elbow joints. The energy generated by such impact is usually of high frequency and short duration with rapid decay, and which is often known as "impact shock." Tight grasping of a golf club grip or tennis racquet grip to keep it from slipping in a user's hands contributes to such impact shock.

Applicant has previously developed resilient grips which successfully reduce or even eliminate impact shock to the muscle and arm joints of the users of golf clubs and the like. See, for example, U.S. Pat. No. 5,374,059 granted to applicant Dec. 20, 1994, and U.S. Pat. No. 5,584,482 granted to applicant Dec. 17, 1996. Such earlier grips utilize a polyurethane layer bonded to a felt layer to define a strip which is spirally wrapped around the handle of a golf club or tennis racquet to conform generally to the external configuration of such handle. In earlier grips of applicant's design, the thickness of the polyurethane layer relative to the thickness of the felt layer as compared to prior art resilient grips was a minimum of approximately 0.18, with the thickness of the polyurethane layer having been about equal to or thicker than the thickness of the textile layer in a typical grip of my design. Also, in some of such earlier grips, the side edges of the polyurethane-felt strip tended to unravel in use, and where the strip was not properly applied to a golf club handle, the grip would tend to loosen relative to the handle, particularly, when a golf club was withdrawn from a golf club bag. To overcome these disadvantages, my later grip designs utilized heatcompressed radially inwardly extending reinforcement side edges formed in the polyurethane layer along the length of the strip. The recessed side edges also enhance the frictional grip of a user's hands on the golf club or tennis racquet. Although my prior grips provide satisfactory results, under humid or rainy conditions water tended to infiltrate the felt layer causing moisture to build up on the grip which could result in a user's hands slipping relative to the grips with a result in diminished control of the golf club or tennis racquet. Similarly, perspiration moisture could also infiltrate the felt layer.

SUMMARY OF THE INVENTION

Applicant has discovered that polyurethane-felt grips of the aforedescribed nature can be made water retarding to permit a user to continue playing even during humid or rainy conditions. Such improved grip utilizes applicant's previously developed concept of bondedtogether layers of polyurethane and felt wherein the ratio of the thickness to the thickness of the felt layer is a minimum of approximately 0.18. The water retarding grip of the present invention utilizes heat-compressed sidewardly and outwardly curved reinforcement side edges along its length, but additionally, the underside of the felt layer is skived to form slanted side edges. The strip is spirally wrapped about a golf club or tennis racquet handle with the underside of the reinforcement side edges overlying the slanted side edges of the felt layer. An adhesive is provided on the underside of the felt layer to adhere the strip to the handle. The profile provided by the overlapped reinforced side edges enhances the frictional grip of a user's hands on a golf club or tennis racquet. The overlapped side edges also restrain unraveling from the strip from the handle, while retarding the entrance of water between the joints defined by the overlapped side edges of the strip. Additionally, the overlapping side edges provide an improved appearance over conventional grips. In a modified embodiment of a grip embodying the present invention, the center of the underside of the felt layer of the strip is also skived to define an upwardly extending groove in the lower portion of the strip. When the strip is spirally wrapped about the handle of a golf club or a tennis racquet, the groove produces a concave spirally extending depression along the length of the grip which cooperates with the pair of convex spirally extending profiles created by the slanted side edges to increase the surface area of the grip engaged by the user's hands to thereby afford additional control of a golf club or tennis racquet. Additionally, the appearance of the grip is further enhanced, while the frictional contact of the overlapping joints of the strip between adjoining golf clubs in a golf bag is reduced to thereby further restrain unraveling of the strip from the golf club.

The polyurethane-felt strip of the present invention may be spirally wrapped about a tapered resilient sleeve that has been applied to the handle of a golf club shaft. Alternatively, the strip may be directly spirally wrapped about the handle of a golf club or tennis racquet. The polyurethane-felt strip may also be spirally wrapped about a tapered sleeve while the sleeve is positioned on a collapsible mandrel to provide a slip-on golf club grip that can be applied to a new golf club or can be utilized as a replacement golf grip.

In addition to the above advantages, the grip of the present invention has been found to greatly cushion the shock transferred from a golf club to a golfer's body or from a tennis racquet to the arm of a tennis player, thereby preventing the danger of injury to a user of the grip. The grip can also provide a long service life, may be manufactured at a low cost, and can be readily installed by a user.

These and other features and advantages of the present invention will become apparent from the following detailed description, when taken in conjunction with the accompanying drawings.

DETAILED DESCRIPTION OF PREFERRED EMBODIMENTS

Figures 26, 27:
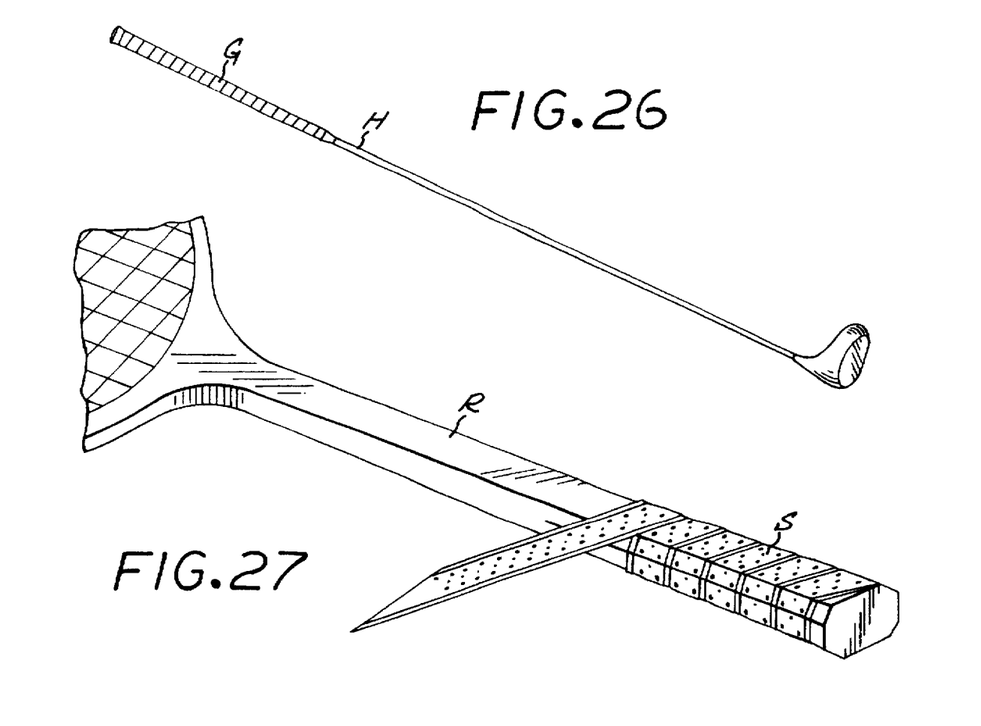
FIG. 26 is a perspective view of a golf club provided with a grip of the present invention.
FIG. 27 is a perspective view showing a grip of the present invention being applied to a tennis racquet.
Figure 28:
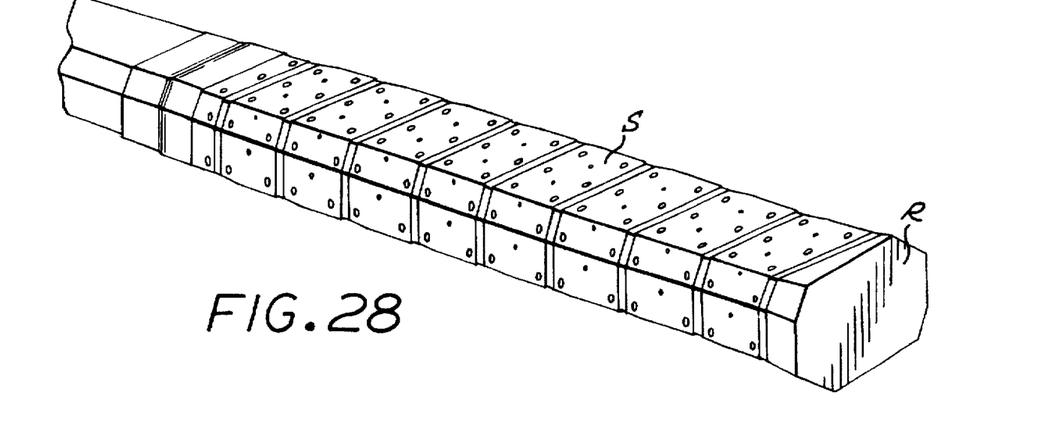
FIG. 28 is a perspective view showing a grip of the present invention as installed on a tennis racquet.
Figure 29:
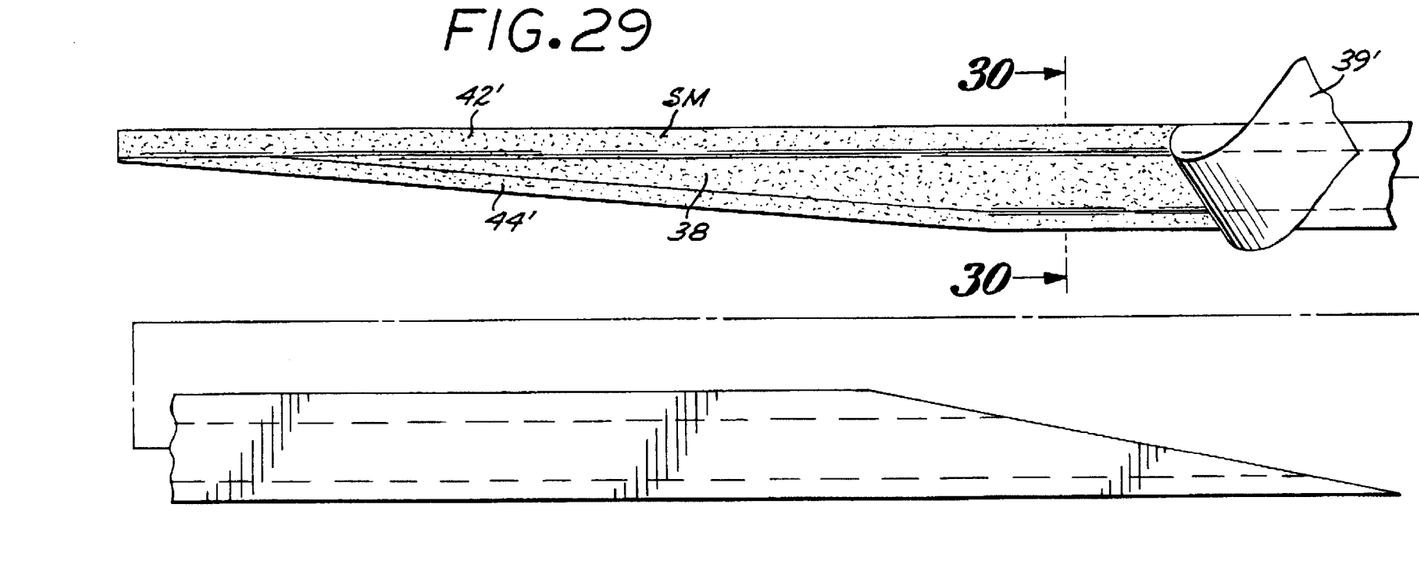
FIG. 29 is a broken top plan view of a modified form of strip embodying the present invention wherein the underside of the felt layer is formed with an upwardly extending groove.
Figure 30:
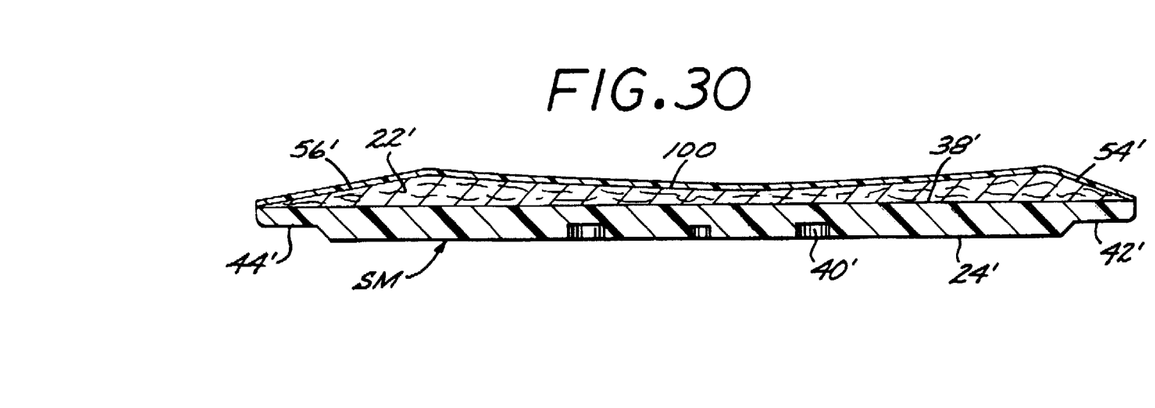
FIG. 30 is a vertical sectional view taken in enlarged scale along line 30—30 of FIG. 29.

Referring to the drawings, a preferred grip G embodying the present invention utilizes an elongated resilient strip S which is spirally wrapped about a golf club handle H, as shown in FIG. 26, or a tennis racquet handle R as shown in FIG. 28. Strip S includes an open-pored felt layer, generally designated 22, having an inner or bottom surface 24 which is adhered to either an underlisting sleeve attached to golf club handle H, to a bare golf club handle or to a tennis racquet handle. The strip S also includes a layer of a suitable resilient synthetic plastic material, such as a smooth closed pore polyurethane layer, generally designated 26, which is bonded to the felt layer 22. The bonded-together polyurethane and textile layers are seen to be configured as the unitary strip S.

Figure 20:
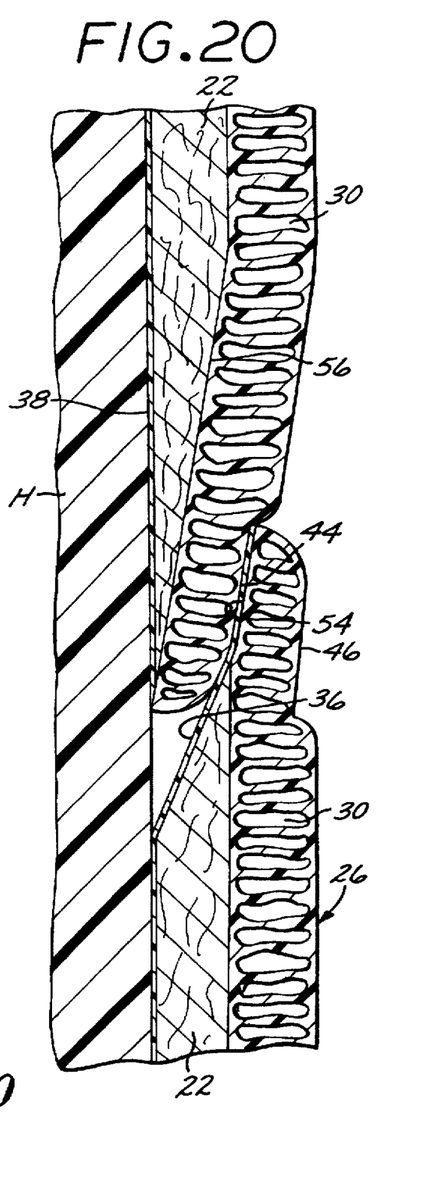
FIG. 20 is a further enlarged vertical sectional view of the area designated 20 in FIG. 19.

More particularly, the porous felt layer 22 has its upper or outer surface 27 bonded to the lower surface 28 of the polyurethane layer 26. As indicated in FIG. 20, the polyurethane layer 26 is formed with pores 30 which extend vertically, i.e. generally normal to the longitudinal axis of the strip S or golf club handle H when the grip has been affixed to such handle. The polyurethane layer 26 may be formed in a conventional manner by coating one side of a felt strip with a solution of polyurethane (e.g. polyester or polyether) dissolved in a dimethyl formamide (DMF), immersing the coated strip in water baths to displace the DMF and cause the urethanes to coagulate, and finally driving off the water by the application of pressure and heat. In this manner, the pores 30 will extend perpendicularly relative to the longitudinal axis of the strip, while the underside 28 of the polyurethane layer 26 is bonded to the upper surface of the felt strip. As noted hereinbefore, applicant has discovered that greatly improved shock absorbing qualities may be obtained in a racquet grip or golf club grip where the thickness of the polyurethane layer to the thickness of the felt layer is increased over the thickness of the felt layer employed in prior art grips. More specifically, applicant considers that the ratio of the thickness of the polyurethane layer to the textile layer should be a minimum of approximately 0.18. In the embodiment shown in the drawings, the thickness of the polyurethane layer is preferably about 0.4 millimeters and the thickness of the felt layer in about 0.9 millimeters. Excellent results have been obtained with this ratio.

The polyurethane layer 26 provides a cushioned grasp of the player's hand on a golf club or tennis racquet handle and also enhances the player's grip by providing increased tackiness between the player's hand and the grip. The felt layer 22 provides strength to the polyurethane layer 26 and serves as a means for attaching the bonded-together polyurethane and felt strip to a handle. As shown particularly in FIG. 8, the underside 24 of the felt layer 22 is provided with a conventional adhesive material 38. The underside of the adhesive material 38 is originally covered with a protective quick-release tape 39 shown particularly in FIG. 10. The polyurethane-felt layer may be formed with vertically extending perforations 40 which frictionally enhance the grasp of a user's hands on the grip. Alternatively, other types of depressions can be formed in the polyurethane layer to frictionally enhance the grip of a user's hands on the grip, e.g., tread patterns.

Figure 1:
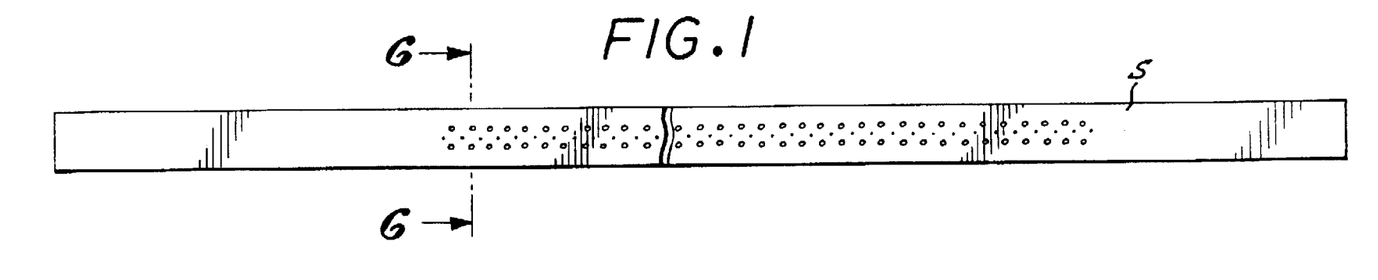
FIG. 1 is a top plan view of a polyurethane-felt strip member of a golf club grip embodying the present invention before the polyurethane layer is formed with sidewardly and outwardly curved reinforcement side edges and the felt layer is provided with skived side edges.
Figure 2:
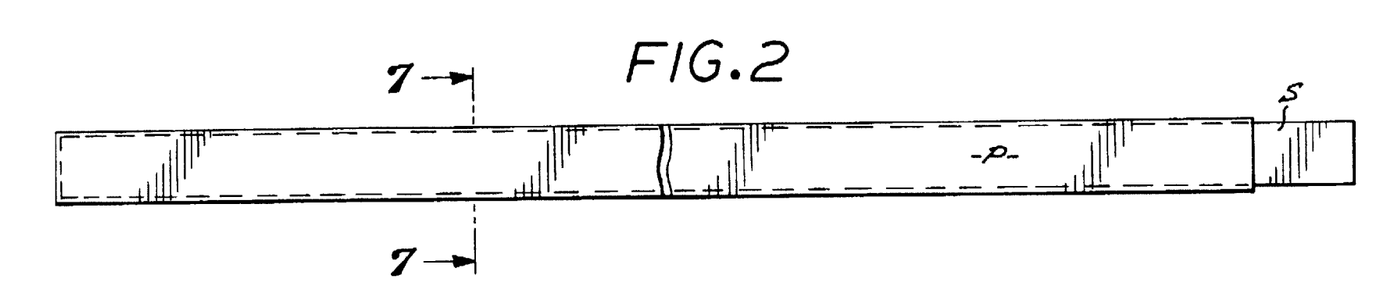
FIG. 2 is a top plan view showing a heated platen utilized to form sidewardly and outwardly curved reinforcement side edges in the polyurethane layer of the strip of FIG. 1.
Figure 3:
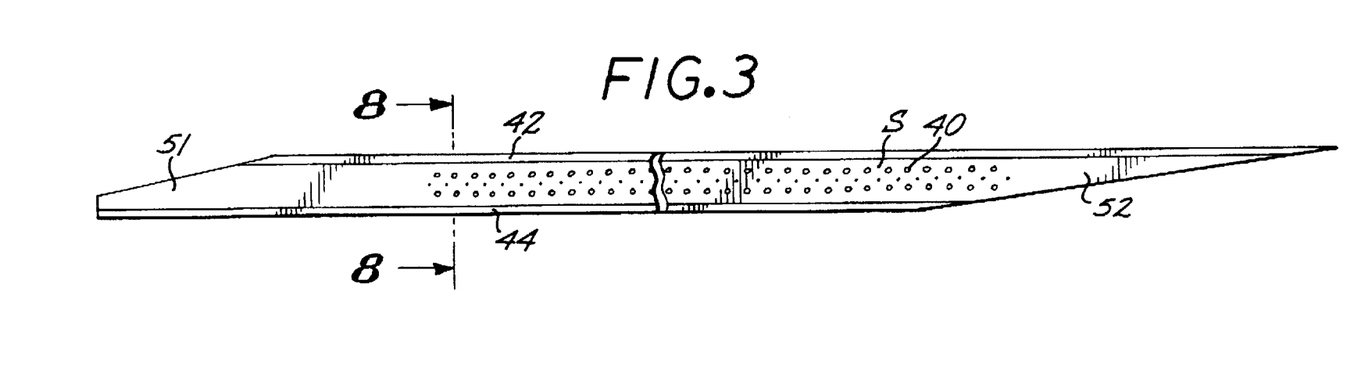
FIG. 3 is a top plan view of the strip of FIGS. 1 and 2 after the sidewardly and outwardly curved reinforcement side edges have been formed along the major portion of the length of the polyurethane layer and the starting and trailing ends have been tapered.
Figure 7:
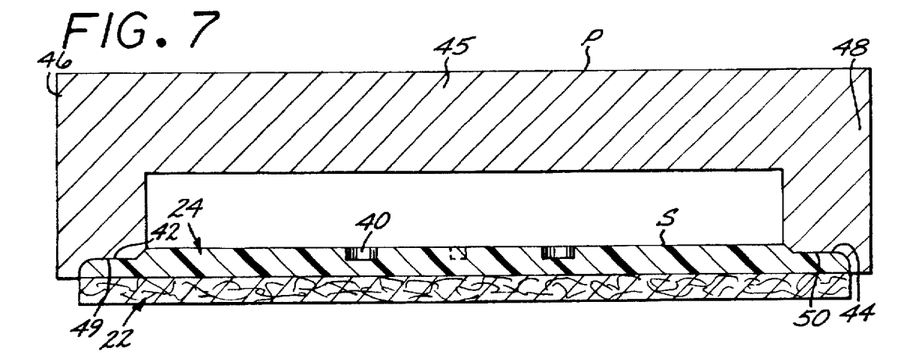
FIG. 7 is a vertical sectional view taken in enlarged scale along line 7—7 of FIG. 2.

FIG. 1 is a top plan view of the strip S before it has been cut to the proper dimensions to be wrapped about a golf club handle. In FIG. 2, the strip S is shown being formed with sidewardly and outwardly extending recessed reinforcement side edges, generally designated 42 and 44. FIG. 3 shows the appearance of the strip after such reinforcement side edges 42 and 44 have been formed thereon. The reinforcement side edges 42 and 44 are preferably formed along the major portion of the strip by means of a heated platen P shown in FIGS. 2 and 7. Referring thereto, platen P may be of conventional metal construction having a horizontal base 45 formed at its opposite sides with depending legs 46 and 48. The lower ends of the legs are configured so as to form the recessed reinforcement side edges 42 and 44. Thus, the lower portion of the platen legs are provided with like —configured mirror image cavities 49 and 50, having a horizontally extending surface, the inner portions of which extend upwardly and inwardly, while the outer edges thereof are curved sidewardly and downwardly. The platen P is heated in a conventional fashion as by means of electrical resistance elements (not shown) and urged downwardly against the sides of the strip S so as to compress side portions of the polyurethane layer 26 below the normal upper surface of such polyurethane layer in the manner shown in FIG. 7 to define the recessed reinforcement side edges 42 and 44. Such compression increases the density and strength of the polyurethane layer in the vicinity of the side edges 42 and 44. It has been found that the width of the recessed reinforcement side edges 42 and 44 may be approximately 2 millimeters, while the depth of the major portion thereof may approximate 0.5 millimeters.

Figure 8:
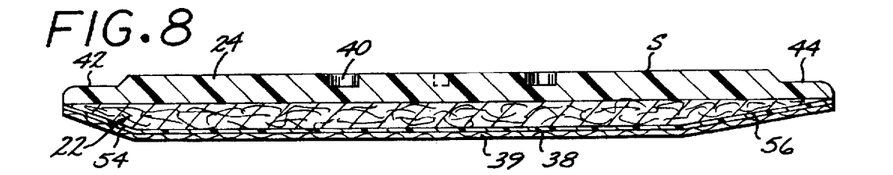
FIG. 8 is a vertical sectional view taken in enlarged scale along line 8—8 of FIG. 9, after the side edges of the felt layer have been skived to form outwardly and upwardly slanted side edges and an adhesive tape has been applied to the underside of the felt layer.
Figure 9:
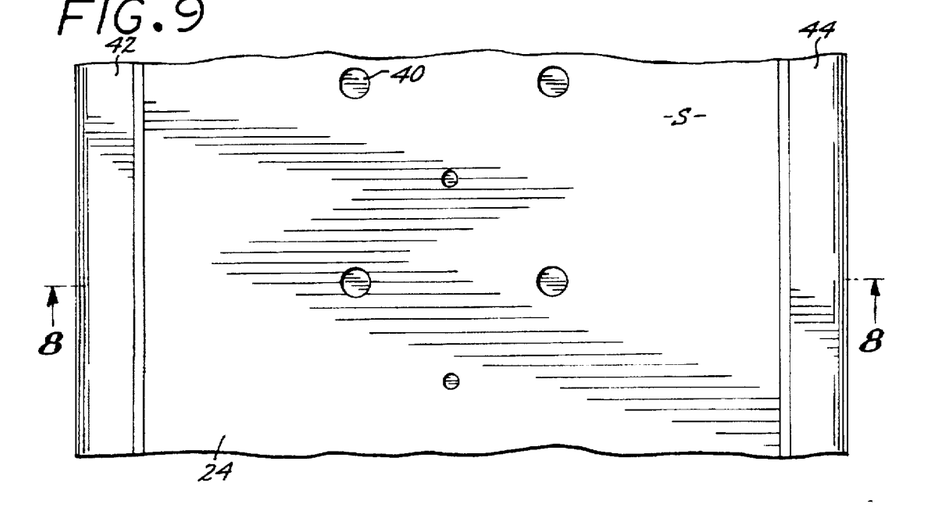
FIG. 9 is a broken top plan view of the strip shown in FIG. 8.

After the reinforcement side edges 42 and 44 have been formed in the front and rear ends of the strip S are cut to define tapered starting aid trailing ends 51 and 52, respectively. In FIGS. 8 and 9, the side edges of felt layer 22 have been skived to form outwardly and upwardly slanted side edges 54 and 56. After such slanted side edges are formed, the adhesive 38 is applied to the entire underside of the felt layer, such adhesive initially being covered in a conventional manner by the peel away tape 39. Preferably, slanted side edge 54 will be shorter than slanted side edge 56, e.g., side edge 54 may be 2–3 mm, while side edge 56 may be 5 mm.

Figure 12:
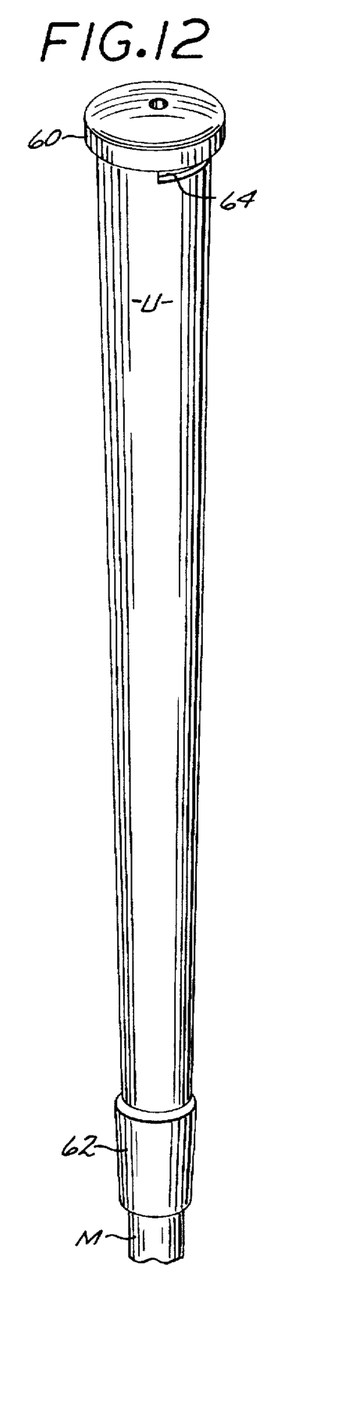
FIG. 12 is a perspective view of a first form of underlisting sleeve utilized in an embodiment of the present invention.
Figure 13:
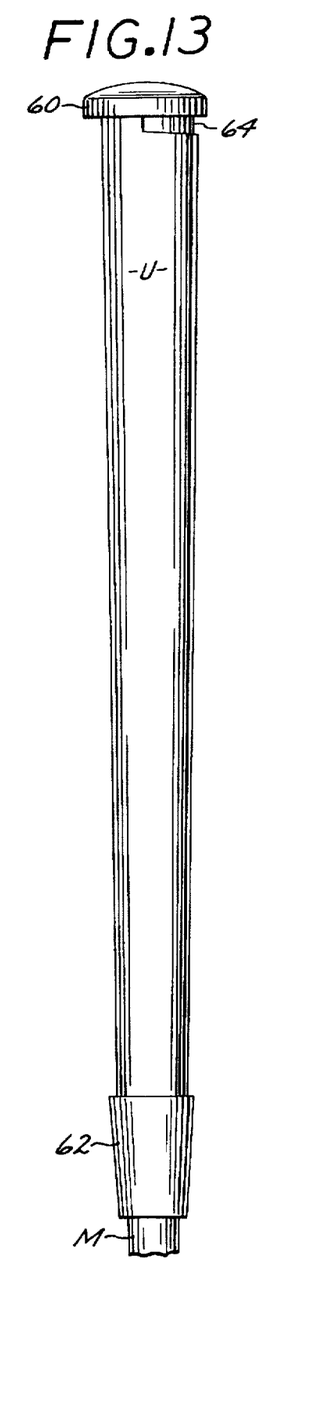
FIG. 13 is a side elevational view of the sleeve of FIG. 12.
Figure 14:
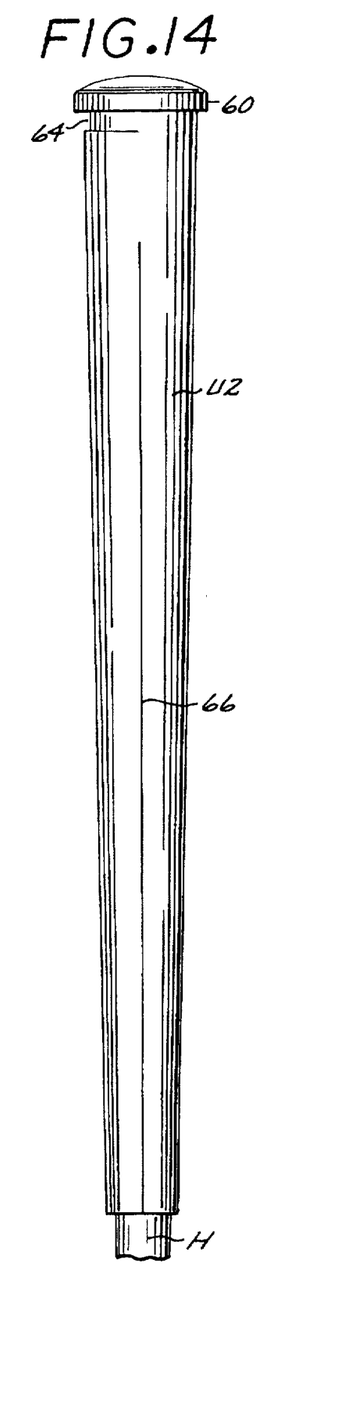
FIG. 14 is a side elevational view of a second form of underlisting sleeve rotated 90 degrees from the position shown in FIG. 13.

Referring now to FIGS. 12 and 13, there is shown first form of a resilient rubber-like underlisting sleeve U utilized in forming the slip-on version of the grip of the present invention. The underlisting sleeve U is fabricated of synthetic plastic foam or rubber utilizing an integral cap 60. The lower portion of the underlisting sleeve U is formed with a guide cylinder 62. Below the cap 60, the upper portion of sleeve U is formed with a groove 64 to receive the tip 65 of the starting end of strip S. In FIG. 14, there is shown a second form of underlisting sleeve U-2 utilized in forming a grip in which the strip S is spirally wrapped about such sleeve while the sleeve is positioned on the shaft H of a golf club. Sleeve U-2 is similar to sleeve U except that it is not formed with a guide cylinder but is formed with a longitudinally extending slit 66 that extends from the upper portion of the sleeve to the bottom of the sleeve to permit installation on golf club handle H.

Figure 4:
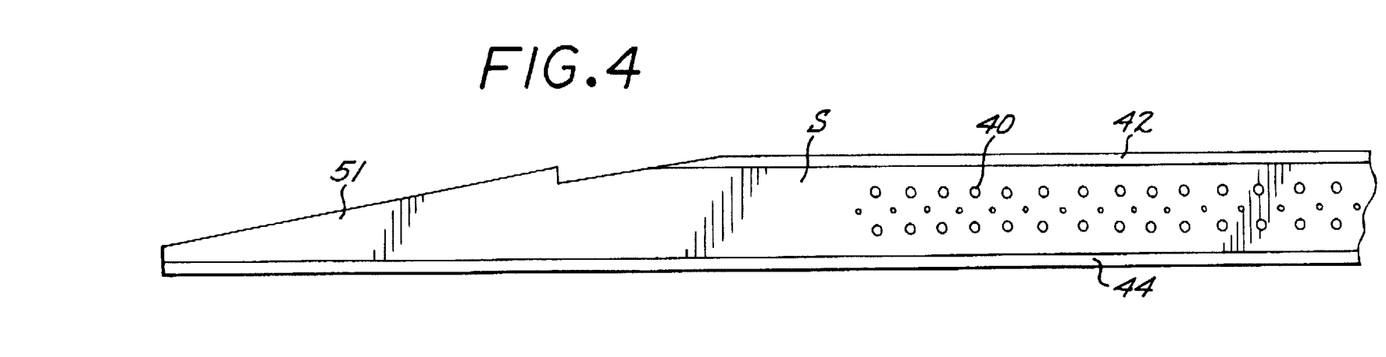
FIG. 4 is a broken top plan view of a second form of strip embodying the invention shown in enlarged scale relative to FIGS. 1, 2, and 3.
Figure 5:
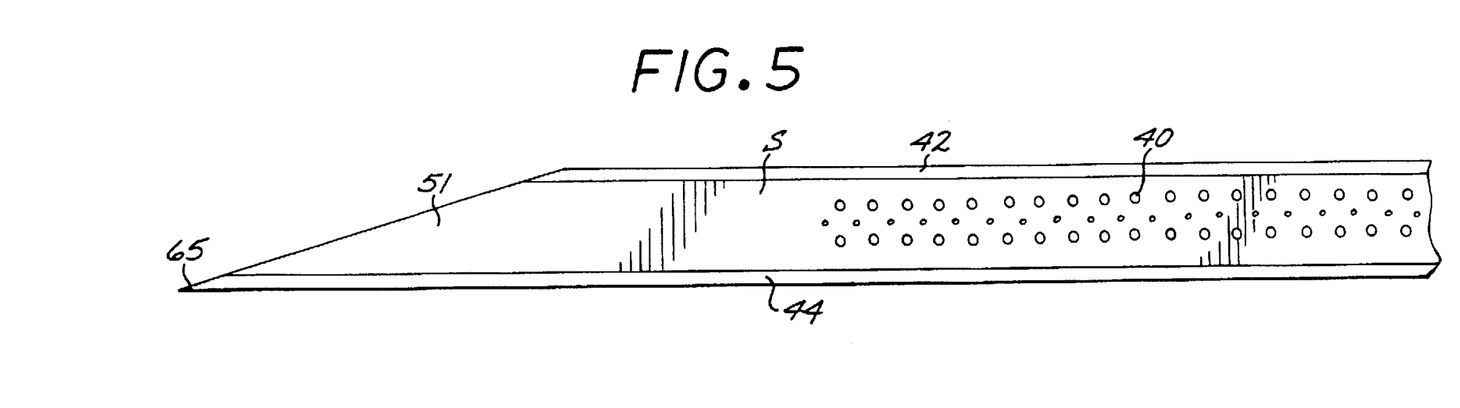
FIG. 5 is a broken top plan view of a third form of strip embodying the invention shown in enlarged scale relative to FIGS. 1, 2, and 3.
Figure 6:
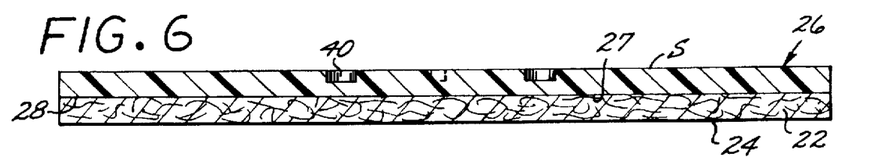
FIG. 6 is a vertical sectional view taken in enlarged scale along line 6—6 of FIG. 1.
Figure 10:
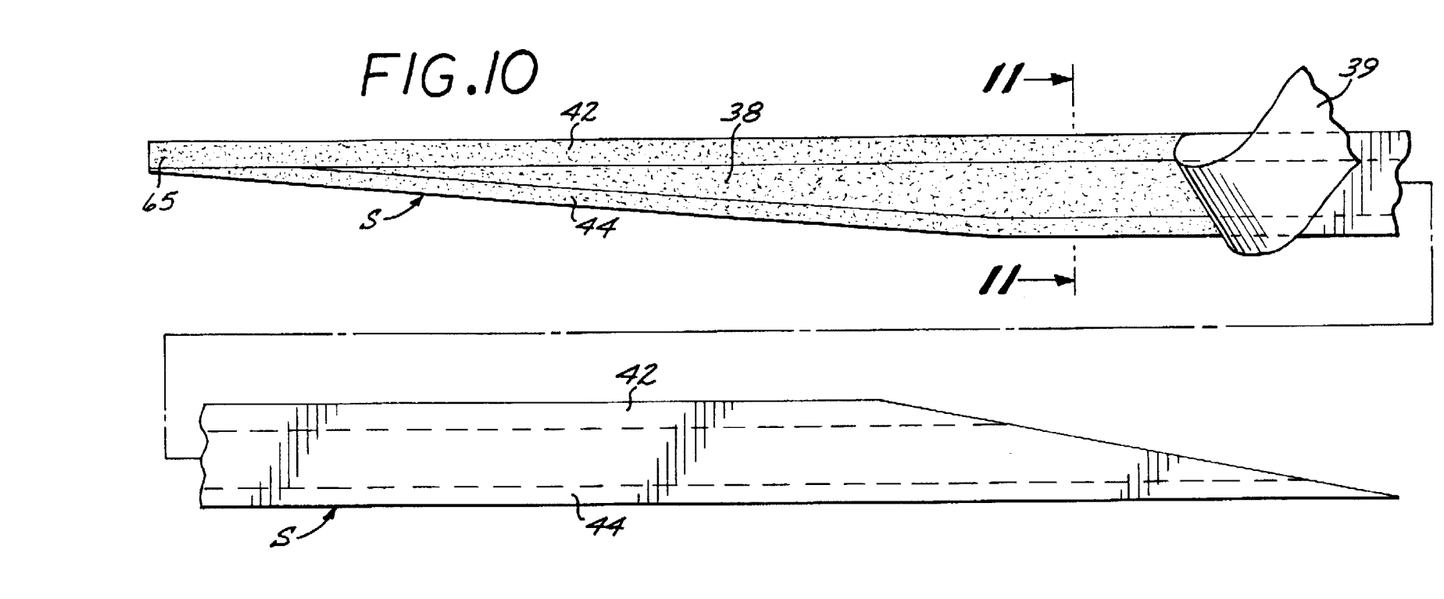
FIG. 10 is a broken view of the underside of the starting strip shown in FIG. 3.
Figure 11:
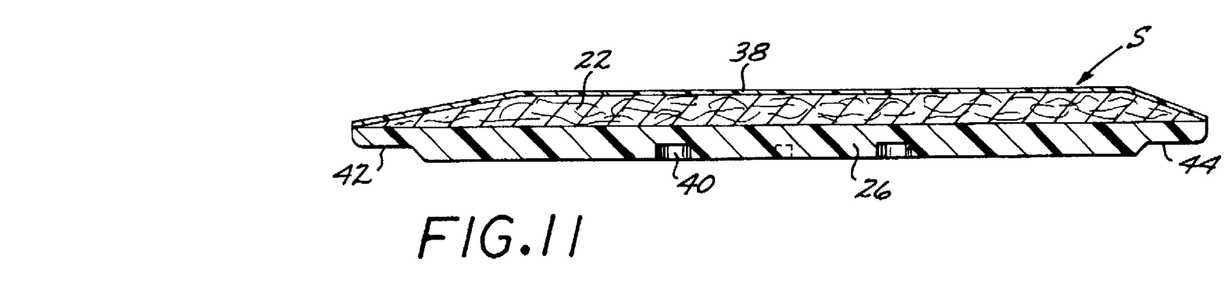
FIG. 11 is a vertical sectional view taken in enlarged scale along line 11—11 of FIG. 10.
Figure 18:
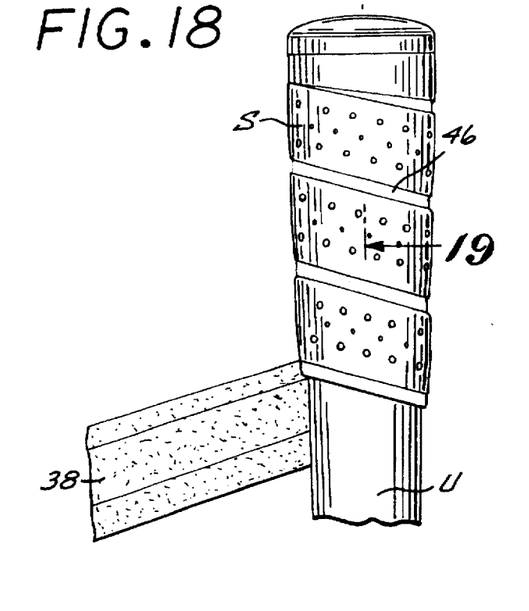
FIG. 18 is a broken side elevational view showing a polyurethane-felt strip embodying the present invention being spirally wrapped around the underlisting sleeves of FIGS. 12 and 13 to form a grip embodying the present invention.
Figure 19:
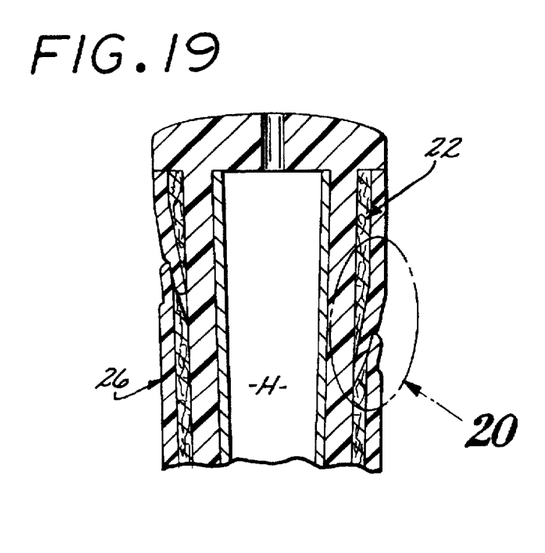
FIG. 19 is a vertical sectional view taken in enlarged scale along line 19—19 of FIG. 18.

Underlisting sleeve U of FIGS. 12 and 13 is removably disposed upon a conventional collapsible mandrel M (FIG. 21) before strip S is spirally wrapped about the sleeve to provide 5 a slip-on grip embodying the present invention. Underlisting sleeve U-2 is adhered to golf club shaft H before strip S is spirally wrapped about such sleeve in the manner shown and described in my U.S. Pat. No. 5,584,482. To apply the strip S to either of the underlisting sleeves, the quick-release tape 39 is peeled off the adhesive 38 on the underside of the felt layer 22. The strip S is then spirally wound around the sleeve starting with the upper end of the sleeve. The tip 65 of the strip's starting end shown in FIGS. 3 and 10 is inserted in groove 64 of the sleeve and the strip is wrapped about 1½ times around the upper or butt end of the sleeve to provide a smooth configuration of the strip on the sleeve, as shown in FIGS. 18 and 19. The strip of FIG. 4 and FIG. 5 is spirally wrapped about a bare golf club handle in the manner described in my patent application Ser. No. 08/632,578.

Figure 15:
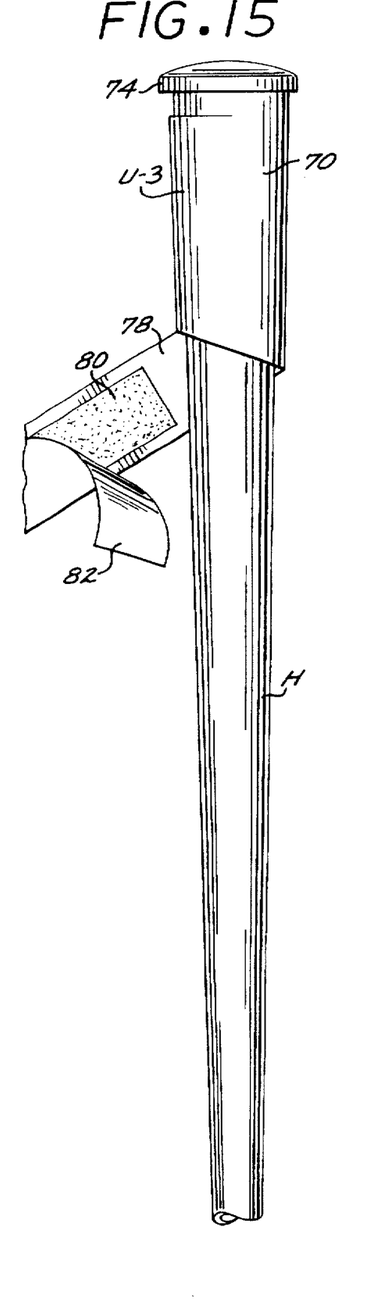
FIGS. 15, 16, and 17 are side elevational views showing a third form of underlisting sleeve which may be utilized in forming a grip embodying the present invention.
Figure 16:
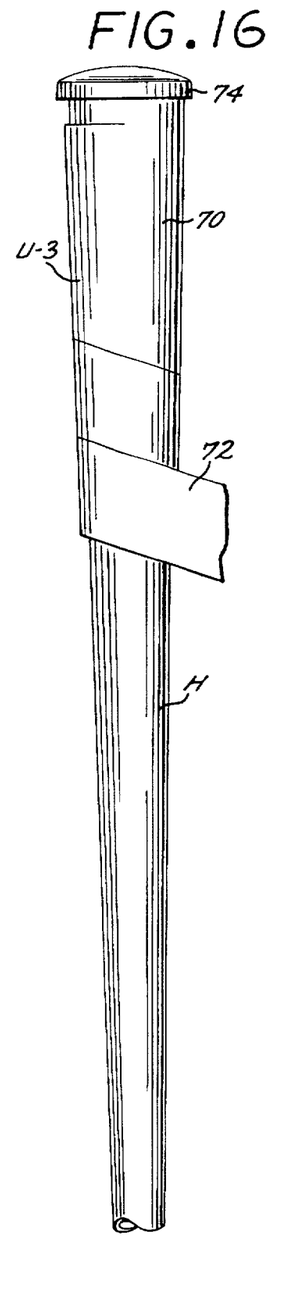
Figure 17:
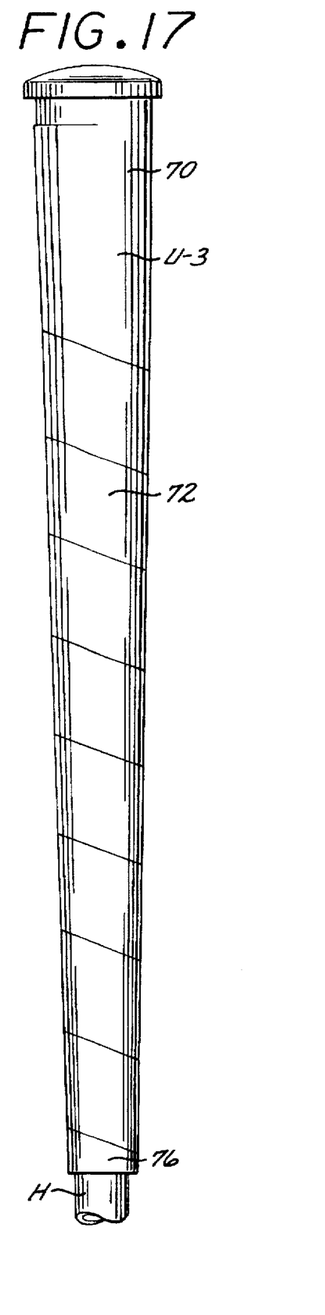

Referring now to FIGS. 15, 16, and 17, there is shown a resilient spirally cut sleeve or underlisting member U-3 which abuts and is adhered to golf club shaft H, and over which is spirally wrapped a felt-polyurethane strip member S.

More particularly, resilient spirally cut sleeve U-3 may be of unitary synthetic plastic foam or rubber construction. Such sleeve includes a cylindrical butt portion 70 from which depends an integral main portion 72. Butt portion 70 is formed with an integral cap 74 which abuts the upper end of the golf club shaft. The inner diameter of the cylindrical butt portion 70 should be so selected as to affect a snug fit with the upper portion of the golf club shaft when telescopically applied thereto as shown in FIG. 15. The lower end of main portion 72 is formed with a triangular tongue 76. A conventional adhesive carrier C shown particularly in FIG. 15 is utilized to attach sleeve U-3 to the golf club shaft H. Such adhesive carrier C includes an elongated flexible plastic body 78 coated on its inner surface with an adhesive 80. Protective tape 82 initially cover the adhesive 80. The adhesive carrier C extends along the length of main portion 72. To apply the spirally cut underlisting U-3 to the handle H of a golf club shaft, the cylindrical butt member 70 is slipped over the upper end of the golf club shaft to telescopically interfit therewith. Thereafter, as shown in FIG. 15, protective tape 82 is peeled off adhesive 80 and the main portion 72 is spirally wrapped about the golf club shaft with the side edges thereof in tight abutment, until the entire length of the elongated base portion has been wrapped about the shaft, as shown in FIGS. 16 and 17.

Referring now to FIGS. 18, 19, and 20, strip S is shown being spirally wrapped about the underlisting sleeve U. It is important to note the underside of the recessed side edges 42 and 44 of the polyurethane layer 30, overlap one another, with such edges being secured together in a watertight manner by adhesive 38. The provision of the slanted side edges 54 and 56 of felt layer 22 permits such overlapping of the recessed side edges 42 and 44. The use of slanted side edges 42 and 44 having different widths permits a more pleasing longitudinal profile of the completed grip while the narrower slanted side edge 54 reduces the amount of felt cut off the felt layer thereby maintaining the strength of the completed strip.

Figure 21:
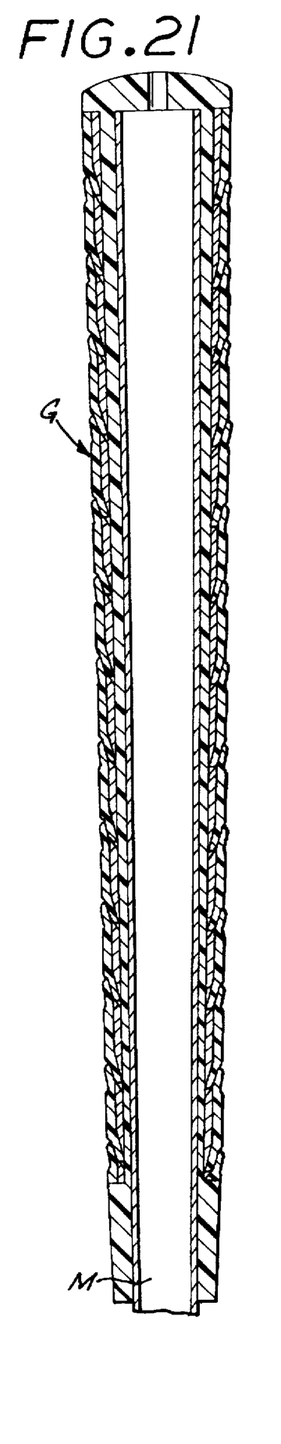
FIG. 21 is a vertical sectional view showing a collapsible mandrel supporting the underlisting sleeve of FIGS. 12 and 13 while a polyurethane-felt strip embodying the present invention is wrapped around such underlisting sleeve.
Figure 22:
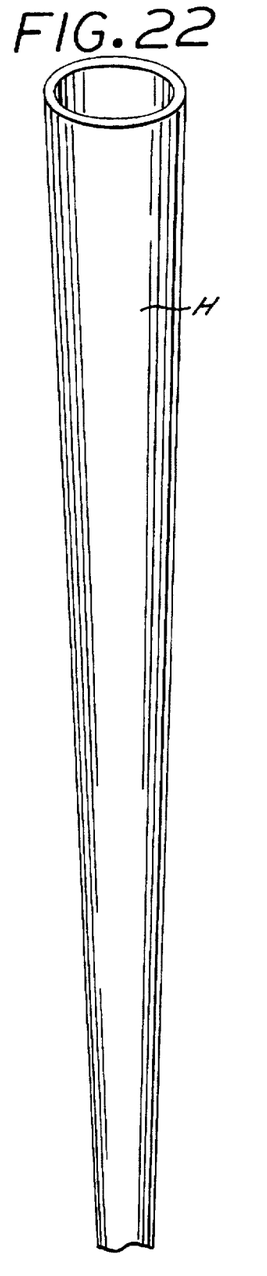
FIG. 22 is a broken side perspective view showing a golf club shaft adapted to directly receive a polyurethane-felt strip embodying the present invention.

It should be understood that where the strip S is spirally wrapped around underlisting sleeve U while the sleeve is supported on collapsible mandrel M, as shown in FIGS. 12, 13, and 21, and after the strip has been spirally wrapped around the sleeve, the mandrel is collapsed and the sleeve and strip assembly axially withdrawn therefrom. The resulting assembly defines a grip embodying the present invention which may be marketed as a replacement grip or as original equipment installed on a complete golf club (the so-called slip-on grip in the golf industry). When the underlisting sleeve U is slipped over the handle of a golf club, the guide cylinder 62 rigidifies the comparatively flexible lower end of the sleeve U to facilitate slipping the sleeve onto the handle.

Referring to FIGS. 22–25, strip S of FIGS. 4 and 5 is shown as being spirally wrapped about a bare handle H of a golf club shaft. Handle H may be radially expanded at a greater angle than the main portion of the golf club shaft to enhance the grasp of a golfer. This design is commonly termed a "big butt" shaft in the golf club trade.

Figure 23:
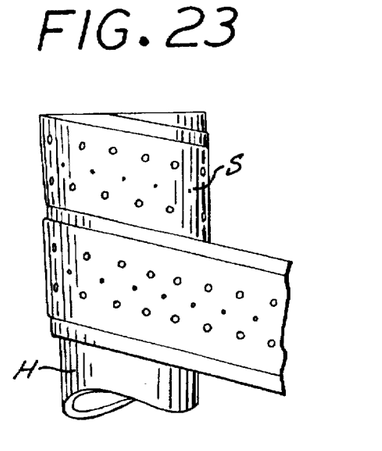
FIG. 23 is a broken side elevational view showing a polyurethane-felt strip of the present invention being wrapped around the golf club shaft of FIG. 22.
Figure 24:
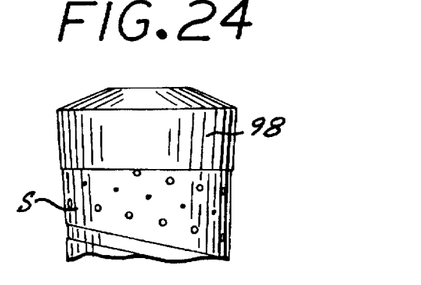
FIG. 24 is a broken side elevational view of a cap applied to the upper end of the golf club shaft of FIG. 23.
Figure 25:
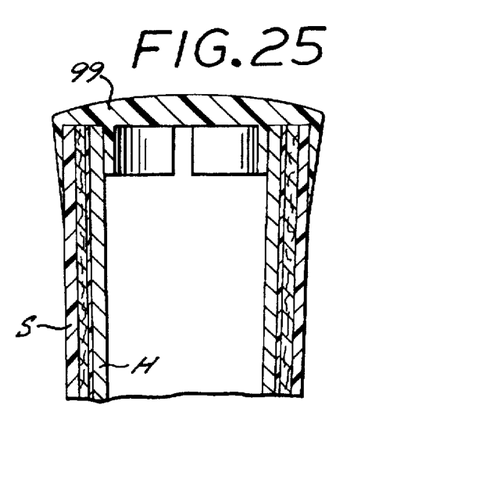
FIG. 25 is an enlarged vertical sectional view showing a second form of cap which may be utilized with a grip embodying the present invention.

In FIG. 23, ship S is shown being spirally wrapped about golf club handle H. Handle H is of hollow construction. FIG. 24 shows the upper end of handle H provided with a conventional solid cap 98 that is telescopically received by the upper end of handle H. FIG. 25 shows the handle H provided with a cap 99 shown and described in my aforementioned patent application Ser. No. 08/632,578.

Referring now to FIGS. 29–32, there is shown a modified form of strip SM embodying the present invention wherein the underside of the felt layer 22' is further skived to form an upwardly extending groove 100 along its length. Other than the addition of such groove, the construction of strip SM is similar to that of strip S and the elements thereof bear primed reference numerals.

Figure 31:
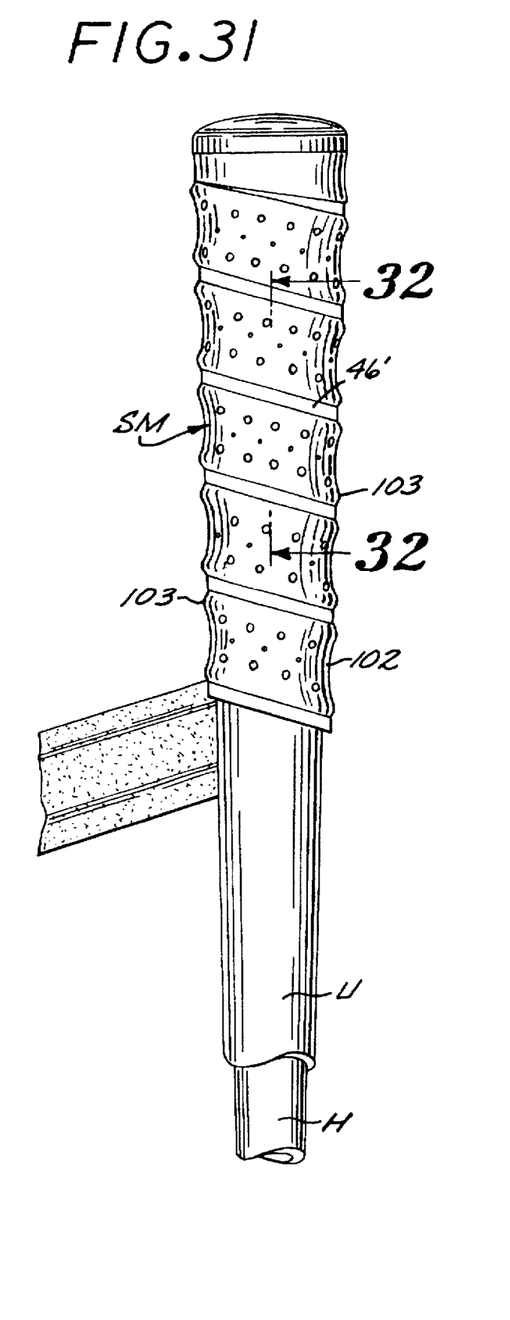
FIG. 31 is a broken side elevational view showing the strip of FIGS. 29 and 30 being spirally wrapped about a golf club handle.
Figure 32:
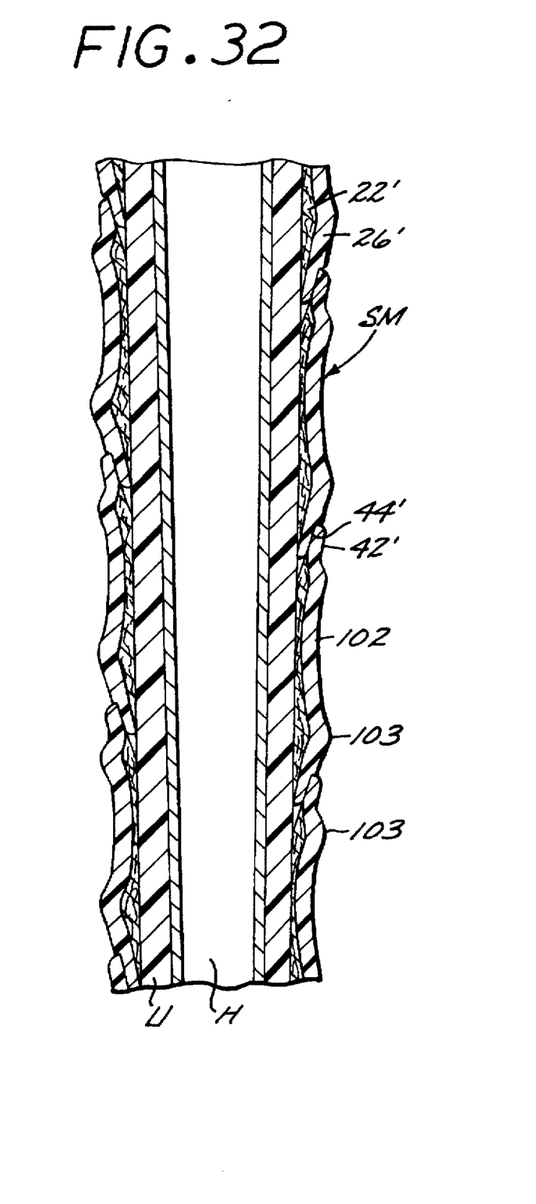
FIG. 32 is a vertical sectional view taken in enlarged scale along line 32—32 of FIG. 31.
Figure 33:
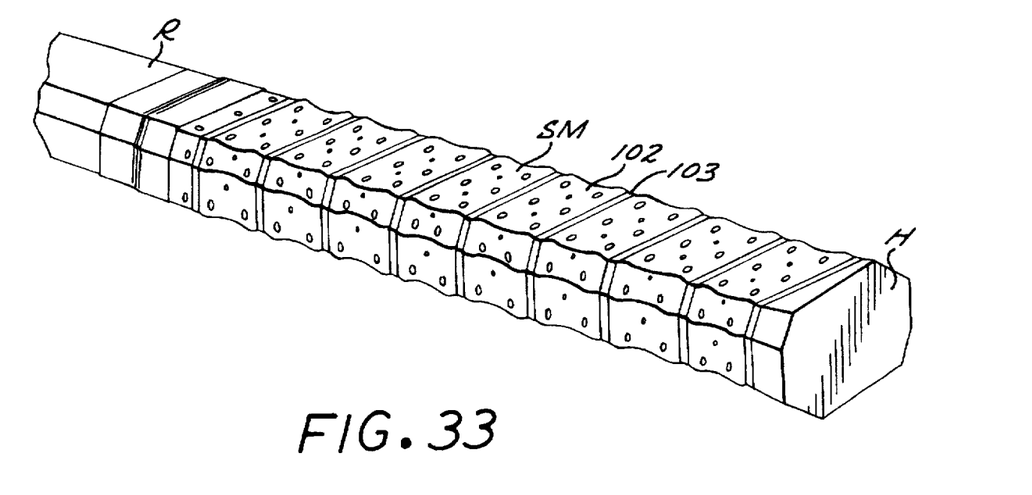
FIG. 33 is a perspective view of the modified form of the grip spirally wrapped around a tennis racquet handle.

As shown in FIGS. 31, 32, and 33, when strip SM is spirally wrapped about an underlisting sleeve U, the bare handle of a golf club or the handle of a tennis racquet, the groove 100 will form a spirally extending concave depression 102 along the length of the grip. Such depression 102 cooperates with the two generally convex spirally extending convex profiles 103 created by the overlapped slanted side edges of the polyurethane layer 26' to increase the surface area of the grip engaged by the user's hands to thereby enhance the frictional contact and hence control of a golf club or tennis racquet by a user. Additionally, a distinctive appearance of the grip is obtained. Furthermore, the frictional contact of the overlapping joints of the strip SM between adjoining golf clubs in a golf bag is reduced when a golf club is removed from the golf bag to further restrain unraveling of the strip from the golf club handle.

In FIG. 33, the strip SM is shown spirally wrapped about the handle H of a tennis racquet.

It should be particularly noted that the grip of the present invention is lighter in weight than conventional grips. Accordingly, more weight is distributed to the club head thereby increasing club head speed without increasing the weight of the golf clubs. Such weight savings moves the center of gravity of the golf club closer to the clubhead, increases the club's moment of inertia, and reduces the overall weight of the club and thereby permits a higher clubhead speed for greater distance. Less shaft twist is also achieved. Applicant's unique lightweight cap 99 shown in FIG. 25 contributes to the light weight of applicant's grip while positively restraining unraveling of the strip relative to the club shaft.

It will be apparent to those skilled in the art, that various modifications can be made without departing from the spirit and scope of the present invention. Accordingly, it is not intended that the invention be limited except by the appended claims.

What is claimed is:

1. The combination of a handle of an impact imparting a device and a resilient grip, comprising:

a strip consisting of an open-pored felt layer having a generally flat inner surface and radially extending side edges, and a flat closed pore polyurethane layer having its inner surface bonded to the outer surface of the felt layer, with the pores of such polyurethane layer extending generally normal to the longitudinal axis of the strip, and with the felt layer providing strength for the polyurethane layer while the polyurethane layer both absorbs shocks and provides tackiness so as to inhibit slippage of a user's hand relative to a handle;

heat compressed radially inwardly extending reinforcement side edges formed in the polyurethane layer of the strip along the length of the strip;

outwardly and downwardly slanted side edges formed along the length of the felt layer;

an adhesive applied to the underside of the felt layer; and the strip being spirally wrapped about the handle with the underside of adjoining recessed side edges overlapping one another to form a water retarding joint between the adjoining side edges.

2. The combination of claim 1, wherein the ratio of the thickness of the polyurethane layer to the felt layer is a minimum of about 0.18 millimeters.

3. The combination of claim 1, wherein the slanted side edge formed along one side of the felt layer is wider than the slanted side edge formed along the opposite side of the felt layer.

4. The combination of claim 3, wherein the width of one of the slanted side edges is about 5–6 mm and the width of the opposite slanted side edge is about 3 mm.

5. The combination of claim 1, wherein perforations are formed in the polyurethane layer, said perforations terminating above the felt layer.

6. The combination of a handle of an impact imparting device and a resilient grip, such combination comprising:

a strip consisting of an open-pored felt layer having a generally flat inner surface and radially extending side edges, and a flat closed pore polyurethane layer having its inner surface bonded to the outer surface of the felt layer, with the pores of such polyurethane layer extending generally normal to the longitudinal axis of the strip, and with the felt layer providing strength for the polyurethane layer while the polyurethane layer both absorbs shocks and provides tackiness so as to inhibit slippage of a user's hand relative to a handle;

an adhesive on the underside of the felt layer;

heat compressed radially inwardly extending reinforcement side edges formed in the polyurethane layer of the strip along the length of the strip;

outwardly and downwardly slanted side edges formed along the length of the felt layer;

a resilient sleeve applied to the handle; and the strip being spirally wrapped about the sleeve to define said grip, with the underside of adjoining recessed side edges overlapping one another to define a water retarding joint between the adjoining side edges.

7. The combination of claim 6, wherein the ratio of the thickness of the polyurethane layer to the felt layer is a minimum of about 0.18 millimeters.

8. The combination of claim 6, wherein the slanted side edge formed along one side of the felt layer is wider than the slanted side edge formed along the opposite side of the felt layer.

9. The combination of claim 8, wherein the width of one of the slanted side edges is about 5–6 mm and the width of the opposite slanted side edge is about 3 mm.

10. In a golf club grip,
- a strip consisting of an open-pored felt layer having a generally flat inner surface and a smooth closed pore polyurethane layer having its inner surface bonded to the outer surface of the felt layer, with the pores of such polyurethane layer extending generally normal to the longitudinal axis of the strip, and with the textile layer providing strength for the polyurethane layer while the polyurethane layer both absorbs shocks and provides tackiness so as to inhibit slippage of a user's hand;
- heat compressed radially inwardly extending reinforcement side edges formed in the polyurethane layer of the strip along the length of the strip;
- outwardly and downwardly slanted side edges formed along the length of the felt layer; and
- an adhesive applied to the underside of the felt layer.

11. The combination of claim 10, wherein the slanted side edge formed along one side of the felt layer is wider than the slanted side edge formed along the opposite side of the felt layer.

12. The combination of claim 10, wherein an upwardly extending groove is formed on the underside of the center of the length of the felt layer.

13. The combination of claim 10, wherein perforations are formed in the polyurethane layer, said perforations terminating above the felt layer.

14. A method of making a golf club grip, said method comprising:
- forming a strip consisting of an open-pored felt layer having a generally flat inner surface to encompass a handle and a flat closed pore polyurethane layer having its inner surface bonded to the outer surface of the felt layer, with the pores of such polyurethane layer extending generally normal to the longitudinal axis of the strip, and with the felt layer providing strength for the polyurethane layer while the polyurethane layer both absorb shocks and provides tackiness so as to inhibit slippage of a user's hand relative to a handle;
- applying a heated platen radially inwardly against the side edges of the polyurethane layer with sufficient pressure to compress the material of the polyurethane radially inwardly of the upper surface of such layer;
- skiving the underside of the felt layer to form outwardly and downwardly slanted side edges along the length of the felt layer;
- applying an adhesive to the underside of the felt layer;
- providing a resilient sleeve; and
- spirally wrapping the strip around the sleeve with the slanted side edges of the felt layer overlapping one another to form a water retarding joint between the adjoining side edges.

15. The method of claim 14, wherein the slanted side edge formed along one side of the felt layer is formed wider than the slanted side edge formed along the opposite side of the felt layer.

16. The method of claim 14, wherein an upwardly extending groove is formed on the underside of the felt layer along the center of the length of the felt layer.

17. The combination of a handle of an impact imparting a device and a resilient grip, comprising:
- a strip consisting of an open-pored felt layer having a generally flat inner surface and radially extending side edges, and a flat closed pore polyurethane layer having its inner surface bonded to the outer surface of the felt layer, with the pores of such polyurethane layer extending generally normal to the longitudinal axis of the strip, and with the felt layer providing strength for the polyurethane layer while the polyurethane layer both absorbs shocks and provides tackiness so as to inhibit slippage of a user's hand relative to a handle;
- heat compressed radially inwardly extending reinforcement side edges formed in the polyurethane layer of the strip along the length of the strip;
- outwardly and downwardly slanted side edges formed along the length of the felt layer;
- an upwardly extending groove formed on the central underside of the felt layer along its length;
- an adhesive applied to the underside of the felt layer; and
- the strip being spirally wrapped about the handle with the underside of adjoining recessed side edges overlapping one another to form a water retarding joint between the adjoining side edges and the groove forming a spirally extending depression along the exterior of the length of the grip.

18. The combination of claim 17, wherein the slanted side edge formed along one side of the felt layer is wider than the slanted side edge formed along the opposite side of the felt layer.

19. The combination of claim 18, wherein the width of one of the slanted side edges is about 5–6 mm and the width of the opposite slanted side edge is about 3 mm.

20. The combination of claim 18, wherein perforations are formed in the polyurethane layer, said perforations terminating above the felt layer.

21. The combination of a handle of an impact imparting device and a resilient grip, such combination comprising:
- a strip of resilient material having a water retarding outer portion;
- radially inwardly extending reinforcement side edges formed in the outer portion of the strip along the length of the strip;
- outwardly and downwardly slanted side edges formed along the length of the lower portion of the strip;
- an upwardly extending groove formed on the central bottom part of the lower portion of the strip;
- an adhesive on the entire underside of the strip; and
- the strip being spirally wrapped about the sleeve to define said grip, with the underside of adjoining recessed side edges overlapping one another to form a water retarding joint between the adjoining side edges, and the groove forming a spirally extending depression along the length of the exterior of the grip.

* * * * *

UNITED STATES PATENT AND TRADEMARK OFFICE
CERTIFICATE OF CORRECTION

PATENT NO.    : 5,797,813
DATED         : August 25, 1998
INVENTOR(S)   : Ben Huang It is certified that error appears in the above-identified patent and that said Letters Patent is hereby corrected as shown below:

Column 8,
Lines 30 and 67, replace "minimum of about 0.18 millimeters." with -- minimum of about 0.18. --.

Signed and Sealed this

Twenty-fifth Day of February, 2003

JAMES E. ROGAN
*Director of the United States Patent and Trademark Office*